United States Patent [19]

Denton

[11] 4,447,377

[45] May 8, 1984

[54] METHOD OF INSULATING THE EXTERIOR OF A WATER HEATER TANK

[75] Inventor: Donald W. Denton, Ashland City, Tenn.

[73] Assignee: State Industries, Inc., Ashland City, Tenn.

[21] Appl. No.: 353,141

[22] Filed: Mar. 1, 1982

Related U.S. Application Data

[60] Division of Ser. No. 283,983, Jul. 16, 1981, which is a continuation of Ser. No. 101,481, Dec. 10, 1979.

[51] Int. Cl.³ ............................................. B29D 27/04
[52] U.S. Cl. .................................. 264/45.2; 126/375; 264/46.5; 264/46.9
[58] Field of Search .................... 264/45.2, 46.5, 46.9; 126/375

[56] References Cited

U.S. PATENT DOCUMENTS

| | | | |
|---|---|---|---|
| 2,365,086 | 12/1944 | Kamowski | 4/416 X |
| 3,110,302 | 11/1963 | Buehl | 126/363 |
| 3,222,843 | 12/1965 | Schneider | 264/45.2 X |
| 3,313,020 | 4/1967 | Krauskopf | 264/46.9 X |
| 3,485,347 | 12/1969 | McGill et al. | 264/46.5 X |
| 3,521,604 | 7/1970 | Nickel | 122/494 X |
| 4,099,641 | 7/1978 | Suhiedat | 220/444 |
| 4,136,141 | 1/1979 | Bauer et al. | 264/45.2 X |
| 4,269,890 | 5/1981 | Breitling et al. | 264/45.2 X |
| 4,296,799 | 10/1981 | Steele | 264/45.2 X |
| 4,372,028 | 2/1983 | Clark et al. | 264/46.9 X |

FOREIGN PATENT DOCUMENTS

| | | | |
|---|---|---|---|
| 1295171 | 5/1969 | Fed. Rep. of Germany | 219/312 |
| 2341105 | 2/1976 | France | 219/312 |
| 462417 | 10/1968 | Switzerland | 219/312 |

OTHER PUBLICATIONS

*The Condensed Chemical Dictionary*, Tenth Edition, Revised by Gessner G. Hawley, New York, Van Nostrand Reinhold, ©1981, pp. 479, 480, 1126.

Primary Examiner—Philip E. Anderson
Attorney, Agent, or Firm—Michael, Best & Friedrich

[57] ABSTRACT

A water heater including a tank, a cylindrical jacket, surrounding the tank to provide an insulating space therebetween and a cover member mounted on top of the jacket to close off the top of the insulating space. An insulating wall is provided in the insulating space between the tank and the jacket. The insulating wall is comprised of a plastic envelope member and a wall of insulating material which has been foamed-in-place inside the envelope member.

3 Claims, 7 Drawing Figures

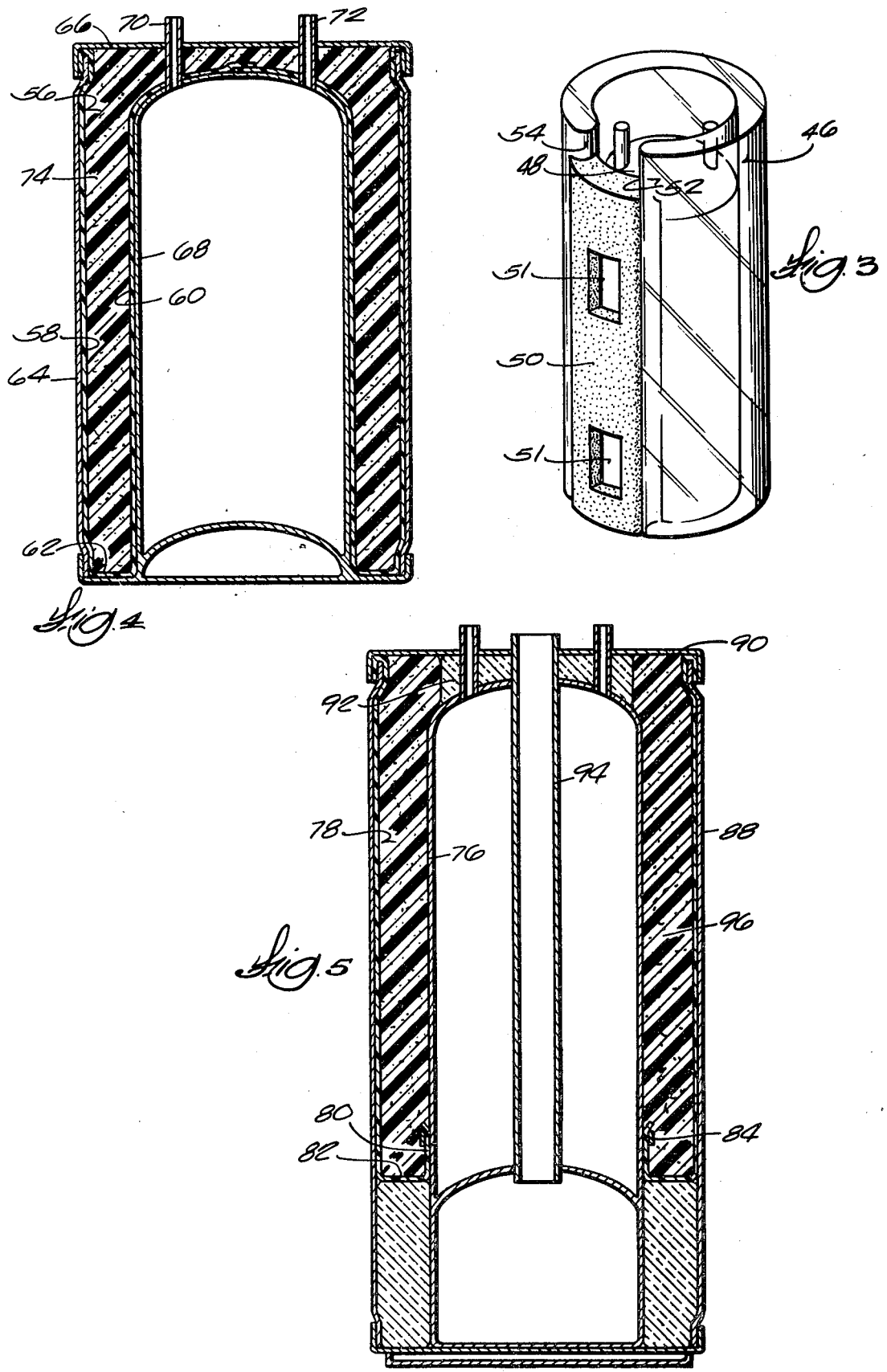

METHOD OF INSULATING THE EXTERIOR OF A WATER HEATER TANK

This application is a division of application Ser. No. 283,983 filed July 16, 1981 which is a continuation of application Ser. No. 101,481 filed Dec. 10, 1979 now abandoned.

BACKGROUND OF THE INVENTION

I. Field of the Invention

This invention relates to water heater constructions and a method of water heater fabrication and more particularly, to a novel method of insulating the exterior of the water heater tank.

II. Description of the Prior Art

It has been the general practice to insulate water heaters with fiberglass insulation material. The use of a rigid polyurethane foam insulation material, as in the present invention, provides several important advantages.

The conductivity factor of polyurethene foam is lower than that of fiberglass providing superior insulation properties. Thus, by the use of polyurethene foam, a given stand-by heat loss can be obtained with a substantially reduced insulation wall thickness as compared to that of conventional fiberglass insulation material. The result is a water heater of reduced diameter providing material savings in packaging and shipping costs. Also the rigidity of the foam insulation as compared to that of fiberglass provides improved resistance of dents. This factor permits the use of less sophisticated shipping containers to further reduce the cost of packaging and shipping.

SUMMARY OF THE INVENTION

A water heater including a tank and a jacket surrounding the tank and spaced therefrom provide an insulating space therebetween. An insulating wall is provided in the insulating space. Such wall includes a plastic envelope member and a wall of rigid polyurethene foam insulation material which has been foamed-in-place inside the envelope member.

DESCRIPTION OF THE DRAWINGS

FIG. 3 is a perspective view similar to FIG. 2 but showing the present invention embodied in an electric water heater;

FIG. 4 is a vertical section view of an electric water heater made in accordance with a second embodiment of the present invention;

FIG. 5 is a vertical sectional view of a gas water heater made in accordance with a third embodiment of the present invention;

DESCRIPTION OF THE PREFERRED EMBODIMENTS

Figure 1:
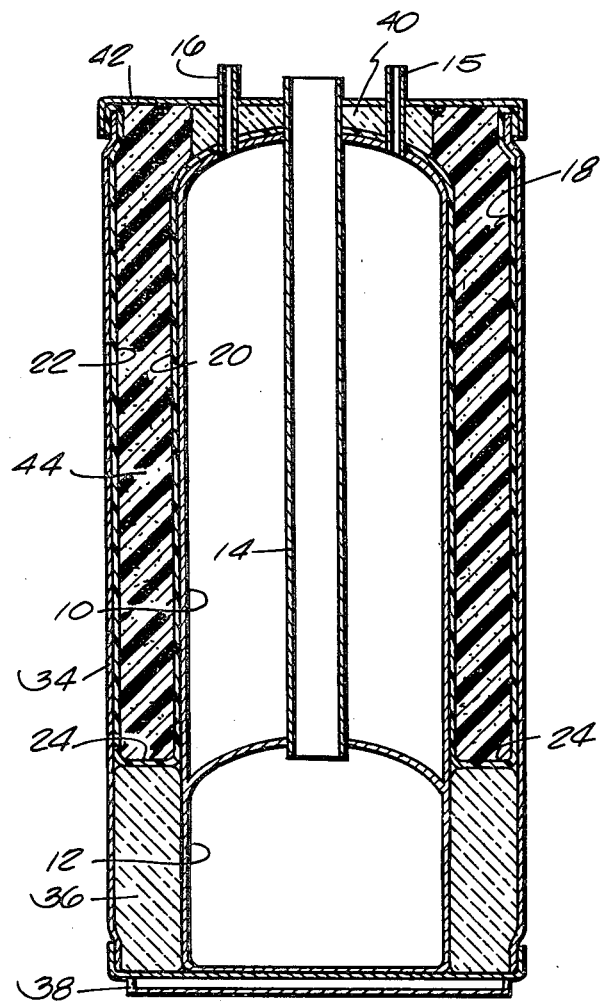
FIG. 1 is a vertical section view of a gas water heater made in accordance with a first embodiment of the present invention.
Figure 2:
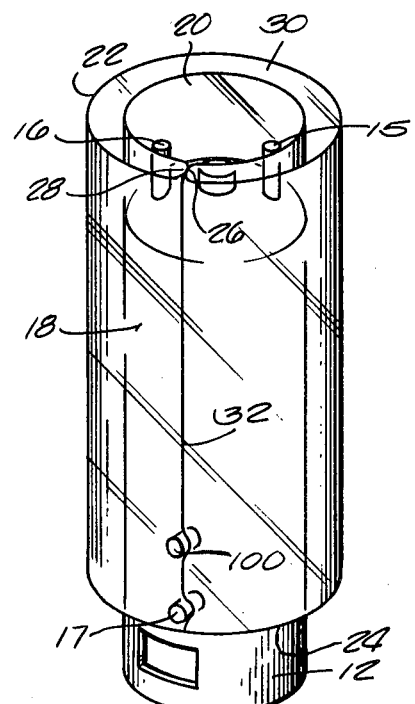
FIG. 2 is a perspective view of the gas water heater shown in FIG. 1 before the installation of the outer jacket and jacket cover.

FIGS. 1 and 2 shown a gas fired water heater made in accordance with the present invention. The heater is comprised of a tank and burner assembly of conventional design comprised of a tank 10 mounted on a combustion chamber 12 and having a central flue 14 extending vertically through the center of tank 10. A burner (not shown) of any suitable design is mounted in combustion chamber 12. Tank 10 is provided with suitable fluid inlet, outlet and drain connections indicated by reference numerals 15, 16 and 17.

The foamed-in-place insulating wall for tank 10 is provided by following a procedure which will now be described.

Referring to FIG. 2, the first step is to wrap a plastic envelope 18 around the tank. Envelope 18 is in the form of an elongated relatively thin tube having an inner wall 20, an outer wall 22, a narrow bottom wall 24, narrow end walls 26 and 28, and an open top 30.

The vertical height of envelope 18 is dimensioned so that it extends a short distance above the top of tank 10 as best shown in FIG. 2. Also, as shown in FIG. 2, the envelope 18 is positioned on tank 10 so that the end walls 26 and 28 abut each other along a vertical line 32 which passes around the fittings 17 and 100 on the side of the tank 10. The envelope can be retained in its FIG. 2 position on the outside of tank 10 by the use of a suitable adhesive.

The next step is to install a metal outer jacket 34 over the envelope 18. With a gas fired water heater like that shown in FIGS. 1 and 2, conventional fiberglass insulation material 36 is installed around the combustion chamber 12 before the jacket 34 is installed. Jacket 34 cooperates with a base member 38 to close off the bottom of the combustion chamber 12.

The next step is to vertically slit the portion of walls 20, 22 of the envelope which extends above the upper edge of jacket 34. The top portion of outer envelope wall 22 is then folded down around the outside of jacket 34 and the top portion of inner envelope wall 20 is folded down so that it will lie across the top of tank 10. A preformed collar member 40 of fiberglass insulation material is installed immediately around the top portion of flue 14.

The next step is to install a metal cover member 42 on the top of jacket 34 to thereby close off the top of the jacket. The installation of cover 42 will capture the top of wall 22 between the cover and the jacket 34.

The next step is to inject a foam-type insulation material into the envelope 18. This is accomplished by introducing the foam components (in liquid form) through an opening (not shown) in cover member 2. Cover member 42 is also provided with a separate vent hole (not shown) which serves as an air vent during the foaming operation and also serves to provide a visual indicator for determining when the envelope 18 is completely filled.

Within a relatively short period of time the foam material will set to thereby provide a rigid wall 44 of insulation material around the tank 10.

The folded down portion of envelope wall 22 is cut off around the edge of top member 42 and the foam injection opening in cover 42 is plugged to complete the fabrication of the water heater. The injection of the foam material into the envelope 18 will cause the end walls 26, 28 to be forced into abutting engagement with each other and into tight contact with any tank connections 17 located along vertical abuttment line 32.

In the preferred embodiment of the present invention the envelope 18 (for a gas fired water heater) is made from polyethylene or other suitable material. Also in the preferred embodiment the foam material 44 is a closed cell rigid polyurethane foam having Freon gas captured in the closed cells thereof. While various specific formulations can be used a typical formulation is comprised of two basic components, namely, resin and isocyanate. The resin is a mixture of polyol, catalyst, a silicone surfactant and a blowing agent. Isocyanate is a chemical compound, e.g., diphenylmethane diisocyanate. The blowing agent is a fluorocarbon or other suitable compound, e.g., Freon-11. The blowing agent in the resin is in liquid form and when combined in the foam machine with isocyanate, the resulting exotherm converts the Freon-11 to a gaseous state, which becomes encapsulated within the cellular structure of the rigid foam material. The equipment for mixing and injecting the foam components is well known in the art and thus will not be described herein.

Referring now to FIG. 3, the view is quite similar to FIG. 2, except that it shows an embodiment of the invention as applied to an electric water heater as opposed to a gas water heater. In the FIG. 3 embodiment, the envelope 46 is wrapped around the tank 48 in a manner similar to that described with respect to the FIG. 2 embodiment. However, with an electric water heater a preformed member 50 of fiberglass or pre-molded rigid polyurethane foam insulation is used to insulate around the thermostatic control and other attachments mounted on the side of the tank 48. This is accomplished by the provision of suitable access openings 51 in member 50. The end walls 52, 54 of the envelope abut the edges of member 50.

The procedure for installing the outer jacket and jacket cover and for injecting a foam insulation material into the envelope 46 of the electric water heater (FIG. 3) is substantially the same as described previously for the gas heater (FIGS. 1 and 2) and thus will not be described in detail again.

The material used for envelope 46 and the foam material injected into the envelope may be the same as that described with respect to the FIG. 1 and 2 embodiment.

FIG. 4 shows another embodiment of the present invention as applied to an electric water heater.

Figure 6:
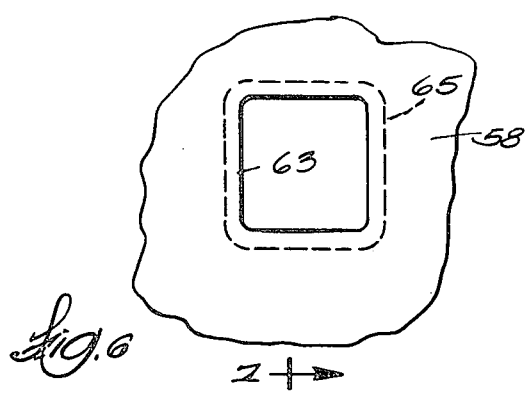
FIG. 6 is a fragmentary view of an envelope of the type shown in FIG. 4 showing a welded cut-out to provide access to an electric component mounted on the side of the electric water heater tank.
Figure 7:
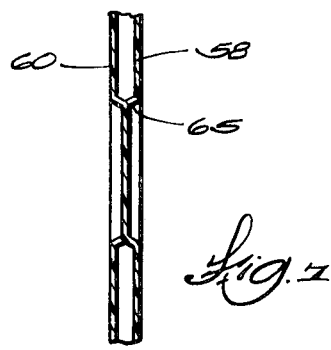
FIG. 7 is a sectional view taken along line 7—7 of FIG. 6.

In the FIG. 4 embodiment, the envelope 56 used therein is of a somewhat different shape than the previously described wrap-around envelopes 18 and 46. Envelope 56 is in the form of a double-walled jacket having concentric cylindrical walls 58, 60 and a bottom wall 62. It will be appreciated that the envelope 56 can be simply formed from a tube of plastic film by rolling one-half of the tube over on itself to thereby form walls 58, 60, and 62. The envelope 56 is provided with a plurality of welded cut-outs to provide access to electrical components mounted on the wall of tank 68. FIGS. 6 and 7 show a typical cut-out 63 with the weld line identified by reference numeral 65.

The upper edge of outer envelope wall 58 is captured between outer jacket 64 and jacket cover 66. The upper portion of inner envelope wall 60 is folded down and over the top of tank 68. Such folded portion can be slit in appropriate places to avoid interference with connection nipples 70, 72.

The procedure for injecting a foam material into envelope 56 to produce a foamed-in-place wall 74 of insulation material is substantially the same as described previously for the gas heater (FIGS. 1 and 2) and thus such procedure will not be described in detail again.

FIG. 5 shows another embodiment of the present invention applied to the tank 76 of a gas fired water heater. The partial envelope 78 used in the FIG. 5 embodiment is similar to the envelope 56 used in the FIG. 4 embodiment except that the inner wall 80 of envelope 78 extends only a short distance up from the bottom wall 82 along the outer surface of tank 76. The top edge of inner wall 80 is secured to the exterior of tank 76 by any suitable means such as a retainer strap member 84.

The upper edge of outer envelope wall 78 is captured between outer jacket 88 and jacket cover 90. Preformed members 92 of fiberglass insulation are fitted around the top of the flue 94 which extends through the tank to prevent direct contact between the foamed insulation material and the wall of the flue.

The procedure for injecting a foam material into envelope 78 to produce a foamed-in-place wall 96 of insulation material is substantially the same as described previously for the gas heater of the FIGS. 1 and 2 embodiment and thus such procedure will not be described in detail again. It will be appreciated that in the FIG. 5 embodiment the side wall of tank 76 serves as one wall of the space into which the foam insulation material is injected.

It will be appreciated from the foregoing that by the use of an envelope as a means of containment of the foam while in the process of rising (molding) as a liquid or froth, the foam is prevented from invading areas that are to be kept free from the foam material (such as electrical components or combustion chamber.) The use of the envelope also provides a means of containment of the foam in its liquid and frothy stage while rising to prevent leakage of foam to the outside of the outer casing of the water heater through the joints of said outer casing. Without the envelope, elaborate means of sealing would have to be used at points where the vertical outer casing joins the base of the outer casing or where fittings attached to the tank protrude through the vertical outer casing.

I claim:

1. The method of insulating a tank comprising the steps of:
    (1) wrapping a plastic envelope around the exterior side wall of the tank;
    (2) installing an outer jacket member around the tank and over the envelope, said jacket member dimensioned so that there will be a space between the tank side wall and the jacket member in which said envelope is positioned;
    (3) installing a cover member on the top of the jacket member to close off the top of the jacket;
    (4) introducing a foam-type insulation material into the envelope through an opening in the cover member, said material when introduced being in the form of a mixture of fluid components which will expand in the envelope and when set will produce a rigid wall of insulating material in the space between the tank wall and the jacket means; and
    (5) plugging the opening in the cover member through which the foam-type insulation material is introduced.

2. The method of insulating a tank comprising the steps of:
    (1) wrapping a plastic envelope around the exterior side walls of the tank, said plastic envelope being positioned around the tank so that the walls thereof extend a short distance above the top of the tank, said envelope having an inner and an outer wall and an opening therein;

(2) installing an outer jacket member over the envelope, said jacket member dimensioned so that there will be a space between the tank side wall and the jacket member in which said envelope is positioned;

(3) vertically slitting the portion of the inner and outer walls of the envelope which extend above the upper edge of the jacket member and then folding down the top portion of the outer wall of the envelope member around the outside of the jacket member and also folding down the inner wall of the envelope so that it will lie across the top of the tank;

(4) installing a cover member on the top of jacket member to thereby close off the top of the jacket, said cover member serving to capture the top of the outer envelope wall between the cover and the jacket;

(5) introducing a foam-type insulation material into the envelope through the opening therein, said material passing through an opening in the cover member, said material when introduced being in the form of a mixture of fluid components which will flow into the envelope and when set will produce a rigid wall of insulating material in the space between the tank wall and the jacket member;

(6) plugging the opening in the cover member; and (7) cutting off the exposed edge of the outer wall of the envelope member which has been folded down around the jacket member.

3. The method of insulating a tank comprising the steps of:

(1) wrapping a plastic envelope around the exterior side walls of the tank, said plastic envelope being positioned around the tank so that the walls thereof extend a short distance above the top of the tank, said envelope having an inner and an outer wall and an opening therein;

(2) installing an outer jacket member over the envelope, said jacket member dimensioned so that there will be a space between the tank side wall and the jacket member in which said envelope is positioned;

(3) folding down the top portion of the outer wall of the envelope member around the outside of the jacket member and also folding down the inner wall of the envelope so that it will lie across the top of the tank;

(4) installing a cover member on the top of the jacket member to thereby close off the top of the jacket, said cover member serving to capture the top of the outer envelope wall between the cover and the jacket; and (5) introducing a foam-type insulation material into the envelope through the opening therein, said material passing thru an opening in the cover member, said material when introduced being in the form of a mixture of fluid components which will flow into the envelope and when set will produce a rigid wall of insulating material in the space between the tank wall and the jacket member.

* * * * *